US012754980B2

(12) United States Patent
Balko et al.

(10) Patent No.: US 12,754,980 B2
(45) Date of Patent: Oct. 6, 2026

(54) ACCELERATING IN-BROWSER TASKS OF AN UNPRIVILEGED WEB APPLICATION

(71) Applicant: Microsoft Technology Licensing, LLC, Redmond, WA (US)

(72) Inventors: Soeren Balko, Brookfield (AU); Brock Andrew Kenzler, Red Hill (AU)

(73) Assignee: Microsoft Technology Licensing, LLC, Redmond, WA (US)

( * ) Notice: Subject to any disclaimer, the term of this patent is extended or adjusted under 35 U.S.C. 154(b) by 187 days.

(21) Appl. No.: 18/458,667

(22) Filed: Aug. 30, 2023

(65) Prior Publication Data

US 2025/0077611 A1 Mar. 6, 2025

(51) Int. Cl.
*G06F 16/958* (2019.01)
*G06F 21/12* (2013.01)

(52) U.S. Cl.
CPC .......... *G06F 21/128* (2013.01); *G06F 16/986* (2019.01)

(58) Field of Classification Search
CPC . G06F 21/12–128; G06F 16/986; G06F 67/51
See application file for complete search history.

(56) References Cited

U.S. PATENT DOCUMENTS 9,558,289 B2 * 1/2017 Chung ............... G06Q 30/0241
11,171,993 B2 11/2021 Frisbie
11,277,486 B2 3/2022 Savolainen
11,397,594 B1 * 7/2022 David ................. G06F 9/44526
2023/0362160 A1 * 11/2023 Krishnan ................ H04L 63/20

FOREIGN PATENT DOCUMENTS

CN 103309877 A * 9/2013
CN 113282856 A * 8/2021 ........... H04L 67/562

OTHER PUBLICATIONS

Karami, Soroush, Panagiotis Ilia, and Jason Polakis. "Awakening the web's sleeper agents: Misusing service workers for privacy leakage." Network and Distributed System Security Symposium. 2021. (Year: 2021).*
"Cross-Origin-Opener-Policy" XS-Leaks Wiki. Oct. 1, 2020 (Year: 2020).*

(Continued)

*Primary Examiner* — Madhuri R Herzog
(74) *Attorney, Agent, or Firm* — Workman Nydegger

(57) ABSTRACT

A device establishes a communications channel between a first web application executing within a first browsing context that is not cross-origin isolated and a second web application executing within a second browsing context that is cross-origin isolated. This includes loading a proxy page within a third browsing context of the web browser, the loading being initiated by the first browsing context, and loading a worker instance using a script provided by the proxy page. Content of the proxy page is served from an origin associated with the second web application. The device passes a first message through the communications channel from the first web application to the second web application. The first message requests the performance of a compute job by the second web application. The device also passes, from the second web application to the first web application, a second message that comprises a result of the compute job.

19 Claims, 4 Drawing Sheets

200

(56) References Cited

OTHER PUBLICATIONS

Meiser, Gordon, Pierre Laperdrix, and Ben Stock. "Careful who you trust: Studying the pitfalls of cross-origin communication." Proceedings of the 2021 ACM Asia conference on computer and communications security. 2021. (Year: 2021).*
International Search Report and Written Opinion received for PCT Application No. PCT/US2024/038437, Oct. 28, 2024, 14 pages.
International Preliminary Report on Patentability (Chapter I) received for PCT Application No. PCT/US2024/038437, Mailed on Mar. 12, 2026, 08 pages.

* cited by examiner

ACCELERATING IN-BROWSER TASKS OF AN UNPRIVILEGED WEB APPLICATION

BACKGROUND

Web browsers are software applications that enable users to access and navigate websites over computer networks such as the Internet. Over the years, web browsers have become essential tools for accessing online information, consuming multimedia content, and interacting with web applications. When interacting with a web application, a web browser executes code (e.g., JavaScript, WebAssembly) defined by the web application. Because it is executed by the web browser, this code follows programming models and APIs (application programming interfaces) made available by web browsers to web applications executing therein. For example, modern web browsers have adopted Web API specifications, standardized by organizations such as the World Wide Web Consortium (W3C) and the WHATWG (Web Hypertext Application Technology Working Group), which provide various functionality to web application developers. Some web browser APIs enable web applications to take advantage of underlying hardware capabilities (e.g., shared memory access, multithreading) of the client computer system on which a web browser executes.

Because they execute code from remote and mostly untrusted sources, web browsers are an attractive target for attacks by malicious parties. As such, modern web browsers take a security-first design approach that isolates code executed by the web browser (e.g., as part of a web application) from the rest of a computer system (e.g., an operating system and other applications executing thereon. Additionally, as part of this security-first design approach, web browsers include technology to isolate websites from each other, except through defined means (e.g., to prevent one website from gaining information about other websites accessed by the same web browser). For example, this technology may restrict the ability of one origin (e.g., scheme, hostname, port) to access information processed or stored by the web browser on behalf of another origin.

Some web browser APIs are unrestricted and can be used by any web application. Other web browser APIs, however, may present security risks, and thus web browsers restrict their use to only web applications that opt-in to certain functional restrictions. For example, due to the risk of side-channel attacks (e.g., the processor vulnerabilities known as Meltdown and Spectre, among others) that may be used by a malicious party to access sensitive information, web browsers have restricted the use of certain Web APIs (e.g., Web APIs that provide access to shared memory, multithreading atomics, and high-resolution timers) to only web applications that opt-in to cross-origin isolation restrictions, which restrict the web application's ability to interact with other origins (e.g., to embed content of other domains within the web application).

The subject matter claimed herein is not limited to embodiments that solve any disadvantages or that operate only in environments such as those described supra. Instead, this background is only provided to illustrate one example technology area where some embodiments described herein may be practiced.

SUMMARY

In some aspects, the techniques described herein relate to methods, systems, and computer program products, including: establishing a communications channel between a first web application executing within a first browsing context of a web browser and a second web application executing within a second browsing context of the web browser, wherein, the first browsing context is not cross-origin isolated, the second browsing context is cross-origin isolated, and establishing the communications channel includes: loading a proxy page within a third browsing context of the web browser, loading of the proxy page being initiated by the first browsing context, wherein content of the proxy page is served from an origin associated with the second web application; and loading a worker instance using a script provided by the proxy page; passing a first message through the communications channel from the first web application to the second web application, the first message requesting performance of a compute job by the second web application, wherein the compute job relies on an API (Application Programming Interface) that is inaccessible by the first web application based on the first browsing context not being cross-origin isolated, and that is accessible by the second web application based on the second browsing context being cross-origin isolated; and passing a second message through the communications channel from the second web application to the first web application, the second message including a result of the compute job.

In some aspects, the techniques described herein relate to methods, systems, and computer program products, including: establishing a communications channel between a first web application executing within a first browsing context of a web browser and a second web application executing within a second browsing context of the web browser, wherein, the first browsing context is not cross-origin isolated, the second browsing context is cross-origin isolated, and establishing the communications channel includes: loading a proxy page within a third browsing context of the web browser, loading of the proxy page being initiated by the first browsing context, wherein content of the proxy page is served from an origin associated with the second web application; and loading a worker instance using a script provided by the proxy page; passing a first message through the communications channel from the first web application to the second web application, the first message requesting performance of a compute job by the second web application, wherein the first message includes a first object of a transferable object type and the communications channel and passes the first object from the first web application to the second web application without copying the first object; and passing a second message through the communications channel from the second web application to the first web application, the second message including a result of the compute job, wherein the second message includes a second object of the transferable object type and the communications channel and passes the second object from the second web application to the first web application without copying the second object.

In some aspects, the techniques described herein relate to methods, systems, and computer program products, including: establishing a communications channel between a first web application executing within a first browsing context of a web browser and a second web application executing within a second browsing context of the web browser, wherein, the first browsing context is not cross-origin isolated, the second browsing context is cross-origin isolated, and establishing the communications channel includes: passing a first message through the communications channel from the first web application to the second web application, the first message requesting performance of a compute job by the second web application, wherein the compute job relies on an API that is inaccessible by the first web application based on the first browsing context not being cross-origin isolated, and that is accessible by the second web application based on the second browsing context being cross-origin isolated; and passing a second message through the communications channel from the second web application to the first web application, the second message including a result of the compute job.

This Summary introduces a selection of concepts in a simplified form that are further described below in the Detailed Description. This Summary is not intended to identify key features or essential features of the claimed subject matter, nor is it intended to be used to determine the scope of the claimed subject matter.

BRIEF DESCRIPTION OF THE DRAWINGS

To describe how the advantages of the systems and methods described herein can be obtained, a more particular description of the embodiments briefly described supra is rendered by reference to specific embodiments thereof, which are illustrated in the appended drawings. These drawings depict only typical embodiments of the systems and methods described herein and are not, therefore, to be considered to be limiting in their scope. Systems and methods are described and explained with additional specificity and detail through the use of the accompanying drawings, in which.

DETAILED DESCRIPTION

Figure 1:
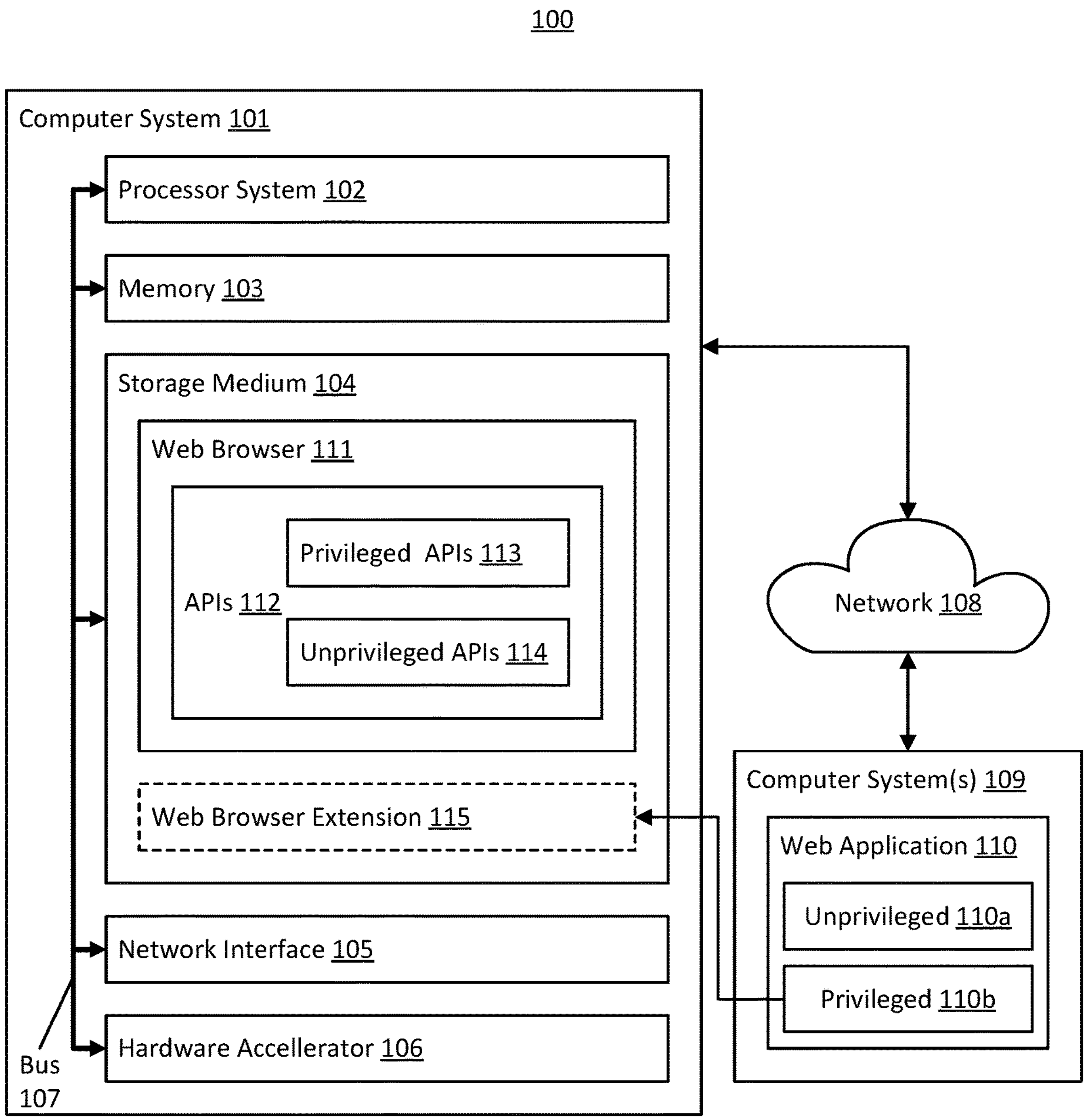
FIG. 1 illustrates an example of a computer architecture that facilitates accelerating in-browser tasks of an unprivileged web application.

For web application developers, the use of restricted Web APIs (application programming interfaces) can enable a web application to perform compute-intensive tasks (e.g., video encoding, machine learning inference and training, blockchain applications) at a user's computer system rather than performing those tasks at a web application server. Performing such tasks at the user's computer system decreases resource consumption of the web application at the server, improves the user experience by decreasing latency, and improves privacy by maintaining data at the user's computer system. However, enabling those restricted Web APIs requires opting into cross-origin isolation restrictions, which prevents the web application from interoperating with other domains (e.g., to embed content from other domains into the web application). Opting into cross-origin isolation restrictions is often impractical for commercial web applications that need to integrate with third-party services (e.g., authentication services, payment services, and the like). Thus, web application developers face a tradeoff between using restricted Web APIs that enable a web application to take advantage of underlying hardware capabilities and the ability to interoperate with other domains.

At least some embodiments described herein overcome this tradeoff by defining a web application architecture that uses current web browser technologies to enable a web application to operate in two portions that operate within different browsing contexts. One portion (e.g., an unprivileged web application) does not opt into cross-origin isolation restrictions, and thus, this portion of the web application retains the ability to interoperate with other domains. Another portion (e.g., a privileged web application) opts into cross-origin isolation restrictions, and thus this portion gains access to restricted Web APIs, such as the "SharedArrayBuffer" Web API for shared memory access, the "Atomics" Web API for multithreading, and the "Performance.now" Web API for high-resolution timers (e.g., timers whose resolution is not artificially limited by the web browser). The web application architecture described herein also includes a novel mechanism for establishing an efficient communication channel between these browsing contexts, enabling the privileged web application portion to request the performance of compute tasks by the unprivileged web application portion at a web browser, and enabling the unprivileged web application portion to send results back to the privileged web application portion. Thus, the web application architecture described herein enables the acceleration of in-browser tasks of an unprivileged web application.

Thus, this disclosure describes technical solutions to the technical problem that security restrictions imposed by web browsers cause a tradeoff between the availability of restricted Web APIs to a web application (e.g., to enable the web application to take advantage of underlying hardware capabilities of an end-user computer system) and ability of the web application to interoperate with domains other than the one to which it is associated. The technical solutions described herein define a web application architecture that uses current web browser technologies to enable a web application to operate in two portions: one that does not opt into cross-origin isolation restrictions (and thus retains the ability to interoperate with other domains), and another that opts into cross-origin isolation restrictions (and thus gains access to restricted Web APIs). The technical solutions described herein also describe a mechanism for establishing an efficient communication channel between these browsing contexts. The technical solutions described herein described herein enable the acceleration of in-browser tasks of an unprivileged web application.

FIG. 1 illustrates an example of a computer architecture 100 that facilitates accelerating in-browser tasks of an unprivileged web application. As shown, computer architecture 100 includes a computer system 101 comprising a processor system 102 (e.g., a single processor or a plurality of processors), a memory 103 (e.g., system or main memory), a storage medium 104 (e.g., a single computer-readable storage medium, or a plurality of computer-readable storage media), and a network interface 105 (e.g., one or more network interface cards), all interconnected by a bus 107. In embodiments, computer system 101 also comprises a hardware accelerator 106. In embodiments, hardware accelerator 106 comprises a graphics processing unit (GPU), a neural processing unit (NPU), and the like. Although illustrated as separate from processor system 102, in some embodiments, hardware accelerator 106 is integral to the processor system 102.

FIG. 1 illustrates the storage medium 104 as storing computer-executable instructions implementing a web browser 111 that interacts with web applications at remote computer systems. For example, in FIG. 1, web browser 111 interacts with web application 110 at computer system(s) 109, based on communications via network interface 105 and network 108. In embodiments, web browser 111 can interact with various remote computer systems and web applications. As used herein, a web application is any application software that is accessed using a web browser, such as web browser 111. A web application, or a portion thereof, may be accessed by web browser 111 remotely (e.g., from computer system(s) 109). Additionally, or alternatively, a web application, or a portion thereof, may be accessed by web browser 111 locally (e.g., from computer system 101, such as by a web browser extension 115).

As shown, web browser 111 makes a variety of APIs 112 available to web applications. These APIs 112 include privileged APIs 113 and unprivileged APIs 114. As used herein, unprivileged APIs are APIs that a web browser makes available to any browsing context, while privileged APIs are APIs that a web browser makes available to a browsing context that is cross-origin isolated. Thus, a browsing context that is not cross-origin isolated has access to unprivileged APIs 114 only, while a browsing context that is cross-origin isolated has access to privileged APIs 113 and unprivileged APIs 114. As used herein, a browsing context is an environment in which a browser (e.g., web browser 111) displays a document, such as a web page. Examples of browsing contexts include a tab, a window, or even only parts of a page (e.g., a frame or an inline frame).

In embodiments, a web application opts into its browsing context being cross-origin isolated by sending two HTTP (hypertext transfer protocol) headers with the web application's top-level document. One of these headers enables COOP (cross-origin-opener-policy) with same-origin (e.g., a header value of "Cross-Origin-Opener-Policy: same-origin"). The other header enables COEP (cross-origin-embedder-policy) with a value indicating "require-corp" (cross-origin resource policy) or "credentialless" (e.g., a header value of "Cross-Origin-Embedder-Policy: require-corp" or "Cross-Origin-Embedder-Policy: credentialless").

Web application 110 is separated into an unprivileged portion 110*a* (e.g., an unprivileged web application) that is not cross-origin isolated and thus has access to only unprivileged APIs 114 and a privileged portion 110*b* (a privileged web application) that is cross-origin isolated and thus has access to privileged APIs 113 and unprivileged APIs 114. The privileged portion 110*b* of web application 110 is served from a second origin that is distinct from a first origin that serves unprivileged portion 110*a* of web application 110. In some embodiments, the first origin that serves unprivileged portion 110*a* is a first domain, and the second origin that serves privileged portion 110*b* is a different second domain. In other embodiments, the first origin that serves unprivileged portion 110*a* is a first domain, and the second origin that serves privileged portion 110*b* is a web browser extension 115 (e.g., as indicated by an arrow from privileged portion 110*b* to web browser extension 115). In embodiments, web browser extension 115 is a software module that is loaded by and customizes web browser 111. In embodiments, web browser extension 115 utilizes browser extension APIs defined by the World Wide Web Consortium (W3C) and adopted by modern web browsers.

In either embodiment, unprivileged portion 110*a* of web application 110 initiates the loading of a proxy page within a new browsing context. Contents of the proxy page are served from an origin (e.g., the web browser extension 115, a different domain than the one used by unprivileged portion 110*a*) corresponding to the privileged portion 110*b* of web application 110. In embodiments, the proxy page proxies messages between a browsing context hosting the unprivileged portion 110*a* of web application 110 to a worker instance (e.g., a Web API "SharedWorker" or "ServiceWorker"). The worker instance, in turn, communicates with a browsing context hosting the privileged portion 110*b* of web application 110.

Thus, using the proxy page and a worker instance, embodiments create a triple-hop two-way communication channel that enables communications between the unprivileged portion 110*a* and the privileged portion 110*b* of web application 110 without violating the cross-origin isolation of the privileged portion 110*b*. In embodiments, the unprivileged portion 110*a* of web application 110 sends messages to the proxy page, the proxy page proxies those messages to the worker instance, and the worker instance sends those messages to the privileged portion 110*b* of web application 110. For example, the unprivileged portion 110*a* may send a message requesting the performance of a compute job by the privileged portion 110*b*, a message requesting the cancellation of a compute job, etc. In some embodiments, a message requesting the performance of a compute job includes one or more job parameters (e.g., input parameters, job configuration parameters, etc.). In some embodiments, the unprivileged portion 110*a* uses a message to transfer the code (e.g., a WebAssembly binary, a JavaScript file) to be executed as part of the compute job. In these embodiments, the privileged portion 110*b* may function as a job-agnostic execution engine with access to privileged APIs 113.

Going the other way, in embodiments, the privileged portion 110*b* of web application 110 sends messages to the worker instance, the worker instance sends those messages to the proxy page, and the proxy page proxies those messages to the unprivileged portion 110*a* of web application 110. For example, the privileged portion 110*b* may send a message comprising the result of a compute job, a status message that signals the progress of compute job completion, an error message if the compute job fails to complete, etc.

In embodiments, the proxy page proxies messages using the "postMessage" and "onMessage" Web APIs. In embodiments, the proxy page also uses the "transferable object" web API type, which enables a no-copy transfer of large chunks of data. Like the proxy page, in embodiments, the worker instance uses the transferable object web API type for no-copy message passing. A no-copy transfer of data is generally faster, and often much faster, than data transfer techniques that create in-memory copies of the data being transferred. Thus, by utilizing no-copy data transfer techniques, the communications channel can quickly and efficiently communicate large messages (e.g., the raw pixels of a video frame, blockchain data) between the unprivileged portion 110*a* and the privileged portion 110*b* of web application 110.

As mentioned, the proxy page is loaded within a new browsing context. In some embodiments, the proxy page is loaded within an <iframe> (inline frame) HTML (hypertext markup language) element, such as a hidden <iframe>, that is loaded by the unprivileged portion 110*a*. In other embodiments, the proxy page is loaded within a separate web browser tab or a separate web browser window (e.g., a popup window) opened by the unprivileged portion 110*a*. In embodiments, when the proxy page is loaded within a separate web browser tab or browser window, that tab/window is configured to be CORS (cross-origin resource sharing) compliant and not cross-origin isolated.

In embodiments, the proxy page launches the worker instance based on registering a script for execution by a Web API SharedWorker or ServiceWorker. In embodiments, the proxy page then registers the web application with the worker instance by passing a unique identifier for the web application to the worker instance. In embodiments, a single worker instance can service a plurality of web application instances, and the use of a unique identifier for each web application instance enables the worker instance to route messages appropriately.

In embodiments, the worker instance is a Web API SharedWorker that executes a stateful script or a Web API ServiceWorker that executes a stateless script. In either embodiment, the Web APIs permit SharedWorker and ServiceWorker instances to be reachable from multiple browsing contexts, which enables communications between the proxy page (e.g., which exists in a different browsing context than both the unprivileged portion 110*a* and the privileged portion 110*b*, but with its contents being served from an origin associated with the privileged portion 110*b*) and the privileged portion 110*b* (e.g., which exists in a cross-origin isolated browsing context). In embodiments, when the worker instance is a SharedWorker (e.g., the worker instance is stateful), the worker instance holds in-memory message queues to account for different lifecycles of the proxy page and the privileged portion 110*b*. In embodiments, when the worker instance is a ServiceWorker (e.g., the worker instance is stateless), message routing is implemented so as to prevent unloading of the worker instance and its state from memory until delivery of a message is completed (e.g., until a message received by the proxy page is successfully passed to the privileged portion 110*b*, or until a message received by the privileged portion 110*b* is successfully passed to the proxy page). To accomplish this, in embodiments, the worker instance synchronizes with the availability of the receiving side (e.g., the privileged portion 110*b* or the proxy page, depending on the data flow direction) to receive a message.

Figure 2:
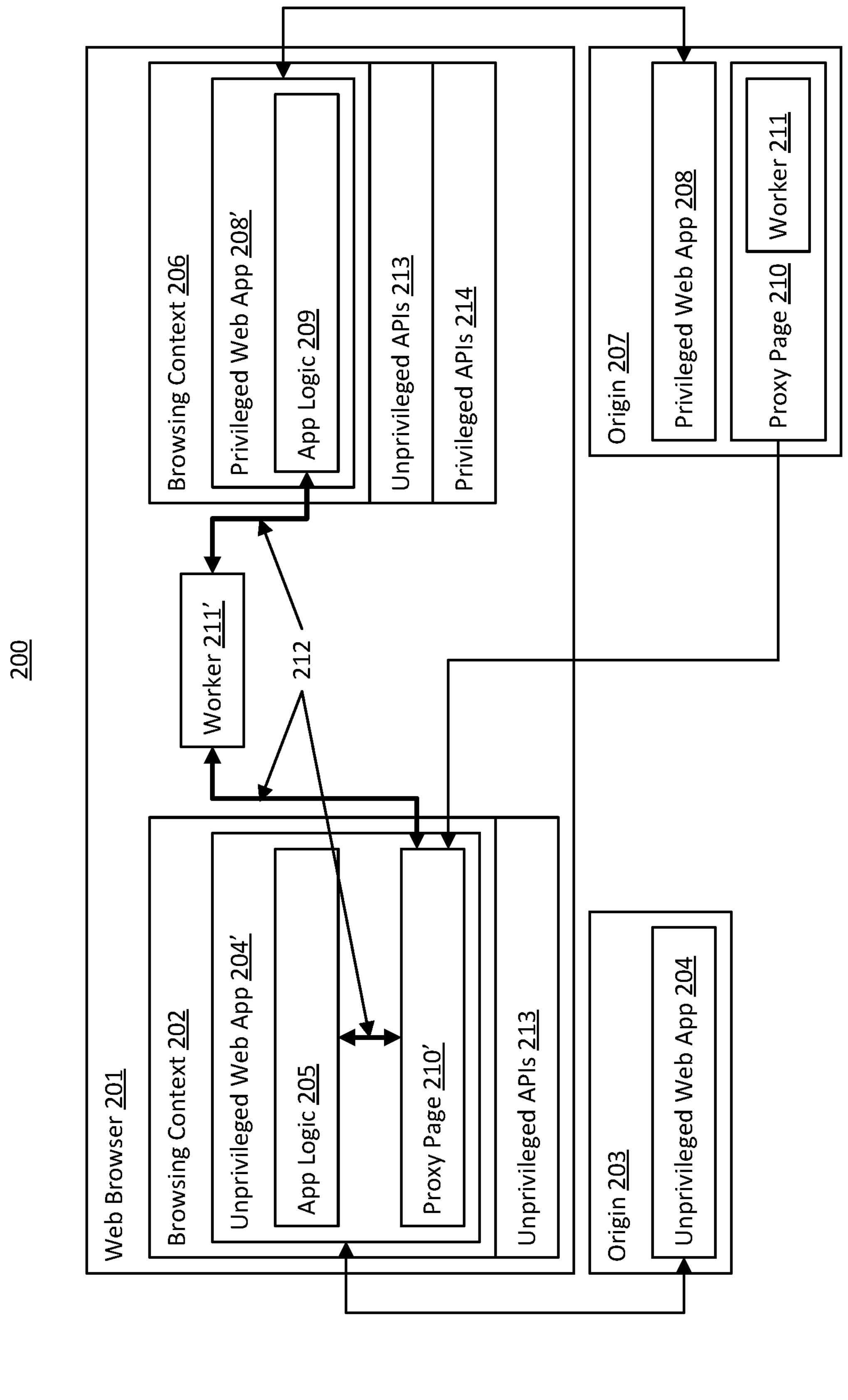
FIG. 2 illustrates an example of accelerating in-browser tasks of an unprivileged web application based on a cross-origin isolated domain.

In some embodiments, the unprivileged portion 110*a* of web application 110 is served by a first domain, while the privileged portion 110*b* of web application 110 is served by a second domain. To demonstrate, FIG. 2 illustrates an example 200 of accelerating in-browser tasks of an unprivileged web application based on a cross-origin isolated domain.

Example 200 shows that a web browser 201 comprises a browsing context 202 corresponding to an unprivileged web application 204', served by origin 203 (e.g., unprivileged web application 204). In embodiments, unprivileged web application 204' is unprivileged because it has not opted into cross-origin isolation (e.g., by omitting at least one of the "Cross-Origin-Opener-Policy: same-origin" or "Cross-Origin-Embedder-Policy: require-corp" HTTP header values); thus, example 200 shows that browsing context 202 has access to unprivileged APIs 213.

Example 200 also shows that web browser 201 comprises a browsing context 206 corresponding to a privileged web application 208', served by origin 207 (e.g., privileged web application 208). In embodiments, privileged web application 208' is privileged because it has opted into cross-origin isolation (e.g., by including both the "Cross-Origin-Opener-Policy: same-origin" and "Cross-Origin-Embedder-Policy: require-corp" HTTP header values); thus, example 200 shows that browsing context 206 has access to privileged APIs 214 in addition to unprivileged APIs 213.

In example 200, unprivileged web application 204' initiates the loading of a proxy page 210' from browsing context 202. Proxy page 210' is loaded within a new browsing context (e.g., a hidden <iframe>, a new browser window, a new browser tab), with the contents of proxy page 210' being served by origin 207 (e.g., proxy page 210). This proxy page 210' registers with a worker 211' (e.g., a Web API SharedWorker or Service Worker) and opens privileged web application 208' within browsing context 206 (e.g., using a "window.open" browser API). In some embodiments, proxy page 210' also launches worker 211' (e.g., from worker 211 within proxy page 210) before connecting to worker 211', though proxy page 210' could connect to an existing worker instance. Once loaded, privileged web application 208' also connects to worker 211'. Thus, example 200 illustrates that based on proxy page 210' and worker 211', a communications channel 212 is established between application logic 205 of unprivileged web application 204' and application logic 209 of privileged web application 208'. Using communications channel 212, application logic 205 requests the performance of tasks by application logic 209 that rely on privileged APIs 214 (e.g., to take advantage of shared memory, multithreading, hardware accelerator 106, etc.), and application logic 209 returns the results of those tasks.

Figure 3:
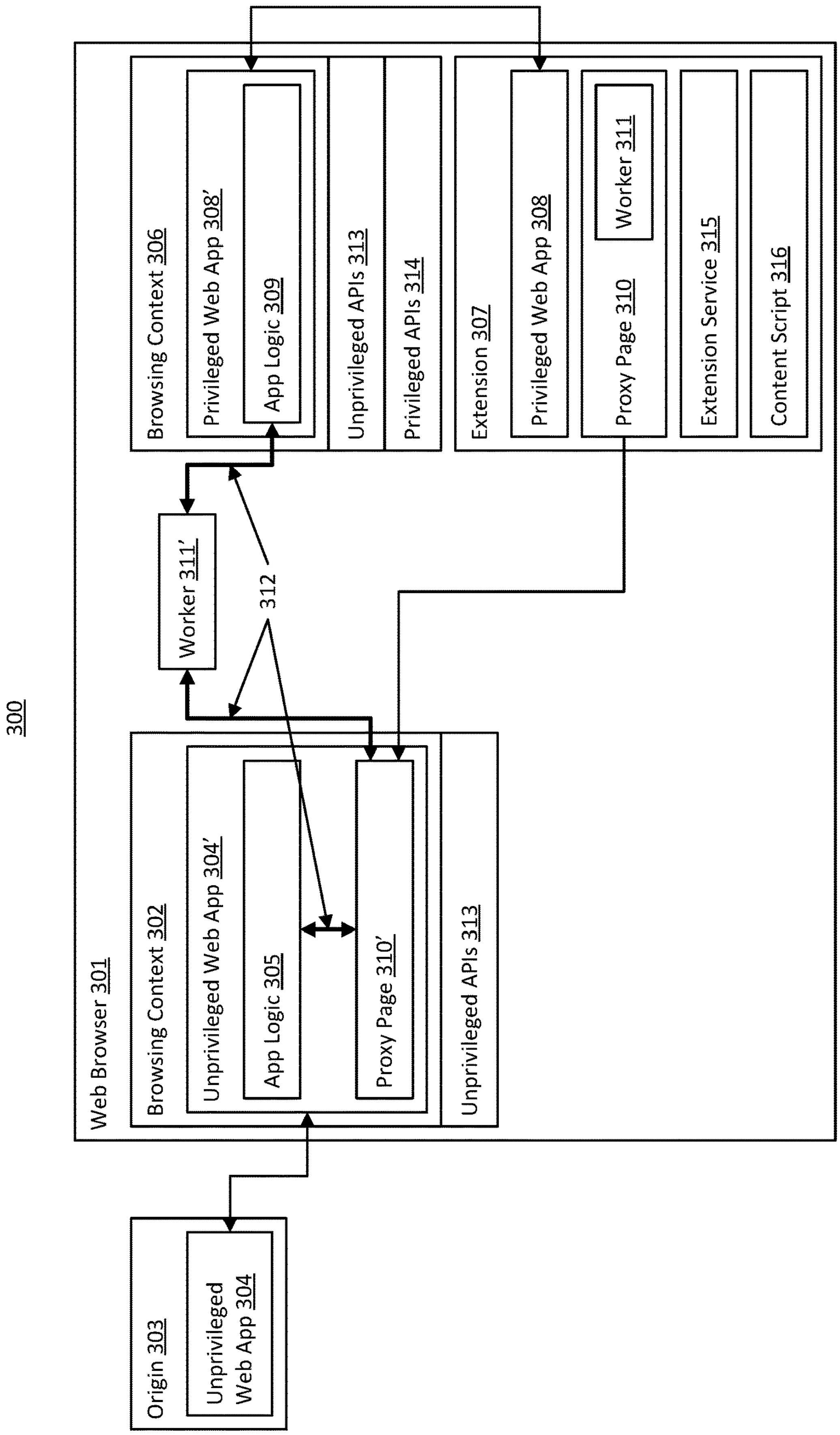
FIG. 3 illustrates an example of accelerating in-browser tasks of an unprivileged web application based on a web browser extension.

In other embodiments, the unprivileged portion 110*a* of web application 110 is served by the computer system(s) 109, while the privileged portion 110*b* of web application 110 is served by web browser extension 115. To demonstrate, FIG. 3 illustrates example 300 of accelerating in-browser tasks of an unprivileged web application based on a web browser extension.

Example 300 shows that a web browser 301 comprises a browsing context 302 corresponding to an unprivileged web application 304', served by origin 303 (e.g., unprivileged web application 304). In embodiments, unprivileged web application 304' is unprivileged because it has not opted into cross-origin isolation (e.g., by omitting at least one of the "Cross-Origin-Opener-Policy: same-origin" or "Cross-Origin-Embedder-Policy: require-corp" HTTP header values); thus, example 300 shows that browsing context 302 has access to unprivileged APIs 313.

Example 300 also shows that web browser 301 comprises an extension 307 (e.g., web browser extension 115), which includes an extension service 315 and a content script 316. In embodiments, extension service 315 implements an event-driven pattern through a ServiceWorker. In embodiments, extension service 315 detects the loading of unprivileged web application 304' by web browser 301 and injects content script 316 into the scope of unprivileged web application 304'. Then, extension service 315 waits for a message from content script 316.

In embodiments, content script 316 initiates the loading of a proxy page 310' from browsing context 302. Proxy page 310' is loaded within a new browsing context (e.g., a hidden <iframe>, a new browser window, a new browser tab), with the contents of proxy page 310' being served by extension 307 (e.g., proxy page 310). In embodiments, content script 316 also sends a message to extension service 315. In some embodiments, content script 316 generates a unique identifier for the web application instance and passes along the unique identifier as part of the message to extension service 315.

Upon receiving this message, extension service 315 launches browsing context 306 (e.g., an extension page, such as a web browser extension content page or a web browser extension settings page), which loads a privileged web application 308' from extension 307 (e.g., privileged web application 308). In embodiments, privileged web application 308' is privileged because it has opted into cross-origin isolation (e.g., by including both the "Cross-Origin-Opener-Policy: same-origin" and "Cross-Origin-Embedder-Policy: require-corp" HTTP header values); thus, example 300 shows that browsing context 306 has access to privileged APIs 314 in addition to unprivileged APIs 313.

In embodiments, proxy page 310' registers with a worker 311' (e.g., a Web API SharedWorker or Service Worker). In some embodiments, proxy page 310' also launches worker 311' (e.g., from worker 311 in proxy page 310) before connecting to it, though proxy page 310' could connect to an existing worker instance (e.g., an instance loaded by extension 307). Once loaded, privileged web application 308' also connects to worker 311'. Thus, example 300 illustrates that based on proxy page 310' and worker 311', a communications channel 312 is established between application logic 305 of unprivileged web application 304' and application logic 309 of privileged web application 308'. Using communications channel 312, application logic 305 requests the performance of tasks by application logic 309 that rely on privileged APIs 314 (e.g., to take advantage of shared memory, multithreading, hardware accelerator 106, etc.), and application logic 309 returns the results of those tasks.

In embodiments, serving an unprivileged portion of a web application 110 by a first domain, while serving a privileged portion of the web application is served by a second domain, as described in connection with example 200, enables the acceleration of in-browser tasks of an unprivileged web application without any prior user configuration. However, because this embodiment relies on opening the privileged portion of the web application within a new browser tab or window, there is a risk that a user could terminate the privileged portion prematurely (e.g., by closing the browser window/tab that hosts the privileged portion). In embodiments, using a web browser extension, as described in connection with example 300, overcomes these drawbacks because the privileged portion of the web application is loaded within an extension-whose lifecycle follows that web browser rather than a browser tab or window. Additionally, by loading the privileged portion of the web application within an extension's content or settings page, the privileged portion of the web application can be hidden from the user's view.

Embodiments are now described in connection with FIG. 4, which illustrates a flow chart of an example method 400 for accelerating an in-browser compute job of an unprivileged web application. In embodiments, instructions for implementing method 400 are encoded as computer-executable instructions (e.g., one or more of web browser extension 115 and web application 110) stored on a computer storage media (e.g., storage medium 104) that are executable by a processor (e.g., processor system 102) to cause a computer system (e.g., computer system 101) to perform method 400.

The following discussion now refers to a method and method acts. Although the method acts are discussed in specific orders or are illustrated in a flow chart as occurring in a particular order, no order is required unless expressly stated or required because an act is dependent on another act being completed before the act being performed.

Figure 4:
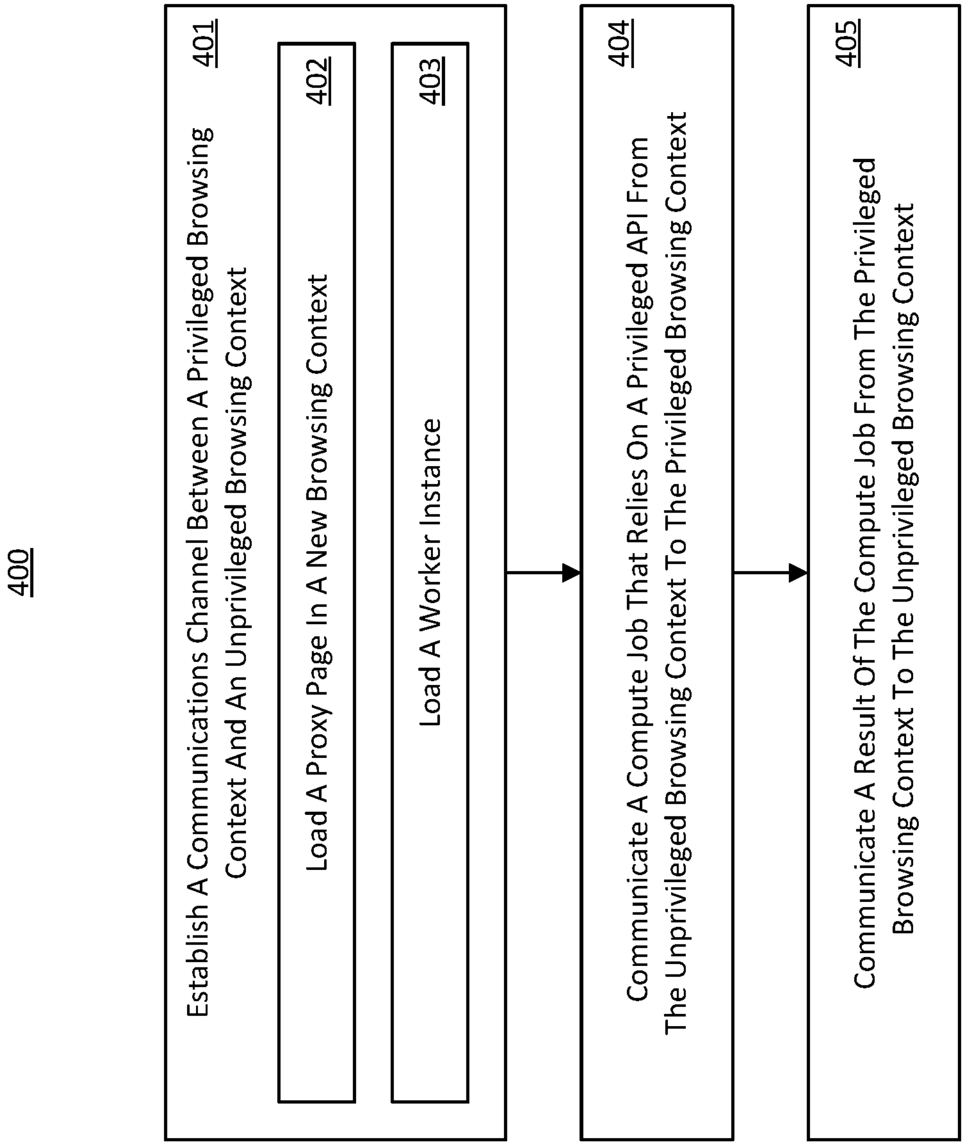
FIG. 4 illustrates a flow chart of an example of a method for accelerating an in-browser compute job of an unprivileged web application.

Referring to FIG. 4, in embodiments, method 400 comprises act 401 of establishing a communications channel between a privileged browsing context and an unprivileged browsing context. In some embodiments, act 401 includes establishing a communications channel between a first web application executing within a first browsing context of a web browser and a second web application executing within a second browsing context of the web browser. In embodiments, the first browsing context is not cross-origin isolated (and, thus, the first web application is unprivileged and has access to only unprivileged APIs 114). In embodiments, the second browsing context is cross-origin isolated (and, thus, the second web application is privileged and also has access to privileged APIs 113). For instance, in example 200, communications channel 212 connects unprivileged web application 204' loaded within browsing context 202 with privileged web application 208 loaded within browsing context 206. In example 300, communications channel 312 connects unprivileged web application 304' loaded within browsing context 302 with privileged web application 308 loaded within browsing context 306.

As shown in act 401, establishing the communications channel comprises act 402 of loading a proxy page in a new browsing context. In some embodiments, act 402 includes loading a proxy page within a third browsing context of the web browser, loading of the proxy page being initiated by the first browsing context, wherein the content of the proxy page is served from an origin associated with the second web application.

For instance, as described in connection with example 200, unprivileged web application 204' initiates the loading of proxy page 210' from browsing context 202 within a new browsing context, with contents of proxy page 210' being served from origin 207, corresponding to privileged web application 208. Thus, in some embodiments of method 400, the origin associated with the second web application is a second domain that is different from a first domain associated with the first web application. In embodiments, the proxy page loads within a new browsing context corresponding to one of an inline frame, a web browser popup, or a web browser tab. In example 200, privileged web application 208' is cross-origin isolated based on the use of Cross-Origin-Opener-Policy and Cross-Origin-Embedder-Policy HTTP header values. Thus, in some embodiments of method 400, the second origin is cross-origin isolated based on being opted into a Cross-Origin-Opener-Policy and a Cross-Origin-Embedder-Policy. In example 200, browsing context 206 may be initiated by browsing context 202 (e.g., using a "window.open" browser API). Thus, in some embodiments of method 400, the first web application initiates the creation of the second browsing context.

Alternatively, as described in connection with example 300, content script 316 of extension initiates the loading of proxy page 310' from browsing context 302 within a new browsing context, with its contents being served from extension 307. Thus, in some embodiments, the origin associated with the second web application is a web browser extension that is cross-origin isolated. In example 300, extension service 315 detects the loading of unprivileged web application 304' and then injects content script 316 into unprivileged web application 304'. Then, content script 316 initiates the loading of proxy page 310'. Thus, in some embodiments of method 400, based on detecting a loading of the first web application, the web browser extension injects a script into the first browsing context, and the script initiates the loading of the proxy page. In example 300, context 306 may be initiated by extension service 315. Thus, in some embodiments of method 400, the web browser extension initiates the creation of the second browsing context. In embodiments, the second browsing context is a content page of the web browser extension or a settings page of the web browser extension. In embodiments, content script 316 also generates an identifier for an instance of the first web application and uses the proxy page to pass the identifier to a worker instance.

As shown in act 401, in some embodiments, establishing the communications channel comprises act 403 of loading a worker instance. In some embodiments, act 403 includes loading a worker instance using a script provided by the proxy page. For instance, in example 200, worker 211' may be loaded by proxy page 210' using worker 211. In example 300, worker 311' may be loaded by proxy page 310' using worker 311. In embodiments, the worker instance has one of a Web API SharedWorker or a Web API ServiceWorker.

In embodiments, establishing the communications channel comprises connecting the proxy page and the unprivileged browsing context to the shared worker instance. In some embodiments, this includes connecting the proxy page and the second web application to a worker that is accessible from the browsing context of the proxy page (and, thus, indirectly, by the first browsing context) as well as the second browsing context. For instance, in example 200, application logic 205 connects to proxy page 210', and proxy page 210' connects to worker 211'. In example 300, application logic 305 connects to proxy page 310', and proxy page 310' connects to worker 311'.

After act 401, method 400 comprises act 404 of communicating a compute job that relies on a privileged API from the unprivileged browsing context to the privileged browsing context. In some embodiments, act 404 includes passing a first message through the communications channel from the first web application to the second web application, the first message requesting the performance of a compute job by the second web application. In embodiments of act 404, the compute job relies on an API that is inaccessible by the first web application based on the first browsing context not being cross-origin isolated, but that is accessible by the second web application based on the second browsing context being cross-origin isolated. In embodiments, the API is one of a SharedArrayBuffer Web API, an Atomics Web API, or a Performance.now Web API, though other privileged APIs are possible (e.g., if browser vendors require cross-origin isolation for future APIs that may constitute an attack vector). In embodiments, passing the first message through the communications channel from the first web application to the second web application comprises communicating the first message from the first browsing context to the third browsing context, from the third browsing context to the worker instance, and from the worker instance to the second browsing context.

For instance, in example 200, application logic 205 uses communications channel 212 to pass a compute job to application logic 209, and application logic 209 processes that compute job using privileged APIs 214, which are not available to browsing context 202. In example 300, application logic 305 uses communications channel 312 to pass a compute job to application logic 309, and application logic 309 processes that compute job using privileged APIs 314, which are not available to browsing context 302. In embodiments, the first message comprises a first object of a transferable object type and the communications channel and passes the first object from the first web application to the second web application without copying the first object.

Method 400 also comprises act 405 of communicating a result of the compute job from the privileged browsing context to the unprivileged browsing context. In some embodiments, act 405 includes passing a second message through the communications channel from the second web application to the first web application. In embodiments, the second message comprises a result of the compute job, the progress of a compute job's completion, an error message (e.g., if the compute job fails to complete), and the like. For instance, in example 200, application logic 209 uses communications channel 212 to pass a result of a compute job to application logic 205. In example 300, application logic 309 uses communications channel 312 to pass a result of a compute job to application logic 305. In embodiments, the second message comprises a second object of the transferable object type and the communications channel and passes the second object from the second web application to the first web application without copying the second object. In embodiments, passing the second message through the communications channel from the second web application to the first web application comprises communicating the second message from the second browsing context to the worker instance, from the worker instance to the third browsing context, and from the third browsing context to the first browsing context.

Embodiments of the disclosure comprise or utilize a special-purpose or general-purpose computer system (e.g., computer system 101) that includes computer hardware, such as, for example, a processor system (e.g., processor system 102) and system memory (e.g., memory 103), as discussed in greater detail below. Embodiments within the scope of the present disclosure also include physical and other computer-readable media for carrying or storing computer-executable instructions and/or data structures. Such computer-readable media can be any available media accessible by a general-purpose or special-purpose computer system. Computer-readable media that store computer-executable instructions and/or data structures are computer storage media (e.g., storage medium 104). Computer-readable media that carry computer-executable instructions and/or data structures are transmission media. Thus, embodiments of the disclosure can comprise at least two distinctly different kinds of computer-readable media: computer storage media and transmission media.

Computer storage media are physical storage media that store computer-executable instructions and/or data structures. Physical storage media include computer hardware, such as random access memory (RAM), read-only memory (ROM), electrically erasable programmable ROM (EEPROM), solid state drives (SSDs), flash memory, phase-change memory (PCM), optical disk storage, magnetic disk storage or other magnetic storage devices, or any other hardware storage device(s) which store program code in the form of computer-executable instructions or data structures, which can be accessed and executed by a general-purpose or special-purpose computer system to implement the disclosed functionality.

Transmission media include a network and/or data links that carry program code in the form of computer-executable instructions or data structures that are accessible by a general-purpose or special-purpose computer system. A "network" is defined as a data link that enables the transport of electronic data between computer systems and other electronic devices. When information is transferred or provided over a network or another communications connection (either hardwired, wireless, or a combination thereof) to a computer system, the computer system may view the connection as transmission media. The scope of computer-readable media includes combinations thereof.

Upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., network interface 105) and eventually transferred to computer system RAM and/or less volatile computer storage media at a computer system. Thus, computer storage media can be included in computer system components that also utilize transmission media.

Computer-executable instructions comprise, for example, instructions and data which, when executed at a processor system, cause a general-purpose computer system, a special-purpose computer system, or a special-purpose processing device to perform a function or group of functions. In embodiments, computer-executable instructions comprise binaries, intermediate format instructions (e.g., assembly language), or source code. For example, in various embodiments, computer-executable instructions comprise WebAssembly, JavaScript, WebGL shader code, WebGPU shader code, HTML, CSS, and the like. In embodiments, a processor system comprises one or more central processing units (CPUs), one or more GPUs, one or more NPUs, and the like.

In some embodiments, the disclosed systems and methods are practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. In some embodiments, the disclosed systems and methods are practiced in distributed system environments where different computer systems, which are linked through a network (e.g., by hardwired data links, wireless data links, or by a combination of hardwired and wireless data links), both perform tasks. As such, in a distributed system environment, a computer system may include a plurality of constituent computer systems. Program modules may be located in local and remote memory storage devices in a distributed system environment.

In some embodiments, the disclosed systems and methods are practiced in a cloud computing environment. In some embodiments, cloud computing environments are distributed, although this is not required. When distributed, cloud computing environments may be distributed internally within an organization and/or have components possessed across multiple organizations. In this description and the following claims, "cloud computing" is a model for enabling on-demand network access to a shared pool of configurable computing resources (e.g., networks, servers, storage, applications, and services). A cloud computing model can be composed of various characteristics, such as on-demand self-service, broad network access, resource pooling, rapid elasticity, measured service, and so forth. A cloud computing model may also come in the form of various service models such as Software as a Service (SaaS), Platform as a Service (PaaS), Infrastructure as a Service (IaaS), etc. The cloud computing model may also be deployed using different deployment models such as private cloud, community cloud, public cloud, hybrid cloud, etc.

Some embodiments, such as a cloud computing environment, comprise a system with one or more hosts capable of running one or more virtual machines (VMs). During operation, VMs emulate an operational computing system, supporting an operating system (OS) and perhaps one or more other applications. In some embodiments, each host includes a hypervisor that emulates virtual resources for the VMs using physical resources that are abstracted from the view of the VMs. The hypervisor also provides proper isolation between the VMs. Thus, from the perspective of any given VM, the hypervisor provides the illusion that the VM is interfacing with a physical resource, even though the VM only interfaces with the appearance (e.g., a virtual resource) of a physical resource. Examples of physical resources include processing capacity, memory, disk space, network bandwidth, media drives, and so forth.

Although the subject matter has been described in language specific to structural features and/or methodological acts, it is to be understood that the subject matter defined in the appended claims is not necessarily limited to the described features or acts described supra or the order of the acts described supra. Rather, the described features and acts are disclosed as example forms of implementing the claims.

The present disclosure may be embodied in other specific forms without departing from its essential characteristics. The described embodiments are only as illustrative and not restrictive. All changes which come within the meaning and range of equivalency of the claims are to be embraced within their scope.

When introducing elements in the appended claims, the articles "a," "an," "the," and "said" are intended to mean there are one or more of the elements. The terms "comprising," "including," and "having" are intended to be inclusive and mean that there may be additional elements other than the listed elements. Unless otherwise specified, the terms "set," "superset," and "subset" are intended to exclude an empty set, and thus "set" is defined as a non-empty set, "superset" is defined as a non-empty superset, and "subset" is defined as a non-empty subset. Unless otherwise specified, the term "subset" excludes the entirety of its superset (i.e., the superset contains at least one item not included in the subset). Unless otherwise specified, a "superset" can include at least one additional element and a "subset" can exclude at least one element.

What is claimed:

1. A method implemented on a computer system that includes a processor system, the method comprising:

establishing a communications channel between 1) a first web application executing within a first browsing context of a web browser, and 2) a second web application executing within a second browsing context of the web browser, wherein,
- the first browsing context is not cross-origin isolated,
- the second browsing context is cross-origin isolated, and
- establishing the communications channel includes:
  - loading a proxy page within a third browsing context of the web browser, loading of the proxy page being initiated by the first browsing context, wherein content of the proxy page is served from an origin associated with the second web application; and
  - loading a worker instance using a script provided by the proxy page;

passing a first message through the communications channel from the first web application to the second web application, the first message requesting performance of a compute job by the second web application, wherein,
- the compute job is one of video encoding, machine learning training, machine learning inference, or a blockchain operation, and
- the compute job relies on an API (Application Programming Interface) that is inaccessible by the first web application based on the first browsing context not being cross-origin isolated, and that is accessible by the second web application based on the second browsing context being cross-origin isolated; and passing a second message through the communications channel from the second web application to the first web application, the second message comprising a result of the compute job.

2. The method of claim 1, wherein, the first message comprises a first object of a transferable object type and the communications channel and passes the first object from the first web application to the second web application without copying the first object; and the second message comprises a second object of the transferable object type and the communications channel and passes the second object from the second web application to the first web application without copying the second object.

3. The method of claim 1, wherein the origin associated with the second web application is a web browser extension that is cross-origin isolated.

4. The method of claim 3, wherein, based on detecting a loading of the first web application, the web browser extension injects a script into the first browsing context; and the script initiates loading of the proxy page.

5. The method of claim 4, wherein the script also, generates an identifier for an instance of the first web application; and uses the proxy page to pass the identifier to the worker instance.

6. The method of claim 3, wherein the web browser extension initiates creation of the second browsing context.

7. The method of claim 3, wherein the second browsing context is a content page of the web browser extension or a settings page of the web browser extension.

8. The method of claim 1, wherein the origin associated with the second web application is a second domain that is different from a first domain associated with the first web application.

9. The method of claim 1, wherein the second browsing context is cross-origin isolated based on being opted into a Cross-Origin-Opener-Policy and a Cross-Origin-Embedder-Policy.

10. The method of claim 1, wherein the first web application initiates creation of the second browsing context.

11. The method of claim 1, wherein the worker instance has one of a SharedWorker Web API or a ServiceWorker Web API.

12. The method of claim 1, wherein the third browsing context of the web browser corresponds to one of an inline frame, a web browser popup, or a web browser tab.

13. The method of claim 1, wherein the API is one of a SharedArrayBuffer Web API, an Atomics Web API, or a Performance.now Web API.

14. The method of claim 1, wherein, passing the first message through the communications channel from the first web application to the second web application comprises communicating the first message from the first browsing context to the third browsing context, from the third browsing context to the worker instance, and from the worker instance to the second browsing context; and passing the second message through the communications channel from the second web application to the first web application comprises communicating the second message from the second browsing context to the worker instance, from the worker instance to the third browsing context, and from the third browsing context to the first browsing context.

15. A computer system, comprising:

a processor system; and a computer storage medium that stores computer-executable instructions that are executable by the processor system to perform operations comprising:

establishing a communications channel between 1) a first web application executing within a first browsing context of a web browser, and 2) a second web application executing within a second browsing context of the web browser, wherein, the first browsing context is not cross-origin isolated, the second browsing context is cross-origin isolated, and establishing the communications channel includes:

loading a proxy page within a third browsing context of the web browser, loading of the proxy page being initiated by the first browsing context, wherein content of the proxy page is served from an origin associated with the second web application; and loading a worker instance using a script provided by the proxy page;

passing a first message through the communications channel from the first web application to the second web application, the first message requesting performance of a compute job by the second web application, wherein, the compute job is one of video encoding, machine learning training, machine learning inference, or a blockchain operation, the compute job relies on an API (Application Programming Interface) that is inaccessible by the first web application based on the first browsing context not being cross-origin isolated, and that is accessible by the second web application based on the second browsing context being cross-origin isolated, and the first message comprises a first object of a transferable object type and the communications channel and passes the first object from the first web application to the second web application without copying the first object; and passing a second message through the communications channel from the second web application to the first web application, the second message comprising a result of the compute job, wherein the second message comprises a second object of the transferable object type and the communications channel and passes the second object from the second web application to the first web application without copying the second object.

16. The computer system of claim 15, wherein the origin associated with the second web application is a web browser extension that is cross-origin isolated.

17. The computer system of claim 15, wherein the origin associated with the second web application is a second domain that is different from a first domain associated with the first web application.

18. The computer system of claim 15, wherein the worker instance has one of a SharedWorker Web API or a ServiceWorker Web API.

19. A computer storage medium that stores computer-executable instructions that are executable by a processor system to perform operations comprising:

establishing a communications channel between 1) a first web application executing within a first browsing context of a web browser, and 2) a second web application executing within a second browsing context of the web browser, wherein, the first browsing context is not cross-origin isolated, the second browsing context is cross-origin isolated, and establishing the communications channel includes:

loading a proxy page within a third browsing context of the web browser, loading of the proxy page being initiated by the first browsing context, wherein content of the proxy page is served from an origin associated with the second web application; and loading a worker instance using a script provided by the proxy page;

passing a first message through the communications channel from the first web application to the second web application, the first message requesting performance of a compute job by the second web application, wherein, the compute job is one of video encoding, machine learning training, machine learning inference, or a blockchain operation, and the compute job relies on an API (Application Programming Interface) that is inaccessible by the first web application based on the first browsing context not being cross-origin isolated, and that is accessible by the second web application based on the second browsing context being cross-origin isolated; and passing a second message through the communications channel from the second web application to the first web application, the second message comprising a result of the compute job.

* * * * *